March 25, 1947.           S. OSCHIN           2,417,883
WELDING SHIELD
Filed Dec. 15, 1943

INVENTOR.
SAMUEL OSCHIN
BY
ATTORNEYS

Patented Mar. 25, 1947

2,417,883

UNITED STATES PATENT OFFICE 2,417,883

WELDING SHIELD

Samuel Oschin, Detroit, Mich.

Application December 15, 1943, Serial No. 514,427

6 Claims. (Cl. 2—8)

This invention relates generally to welding equipment and refers more particularly to improvements in eye shields of the type employed in connection with arc welding.

The principal object of this invention is to provide a relatively simple, light weight shield which is highly effective in protecting the eyes of the operator from the injurious rays of the electric arc characteristic of arc welding.

Another object of this invention is to provide a shield which operates automatically in response to manipulation of the welding circuit. In accordance with this invention, the protective means on the shield is moved to its effective position upon initiation of the operation of the arc welding equipment and is instantaneously moved to its inoperative position upon opening the welding circuit. With this arrangement, the work may be instantly viewed by the operator upon breaking the arc or welding circuit and the welding operation may be immediately initiated without tipping or otherwise manually manipulating the shield.

A further object of this invention is to provide operating mechanism for the protective means characterized in that it moves the latter to its operative position with such rapidity that there is no danger of light emitted by the arc striking the unprotected eyes of the operator. In the present instance the protective means is operated by an auxiliary electric circuit which is energized by the welding circuit at the instant the latter is closed. The flow of current in the welding circuit, of course, takes place before the arc is actually formed and, as a result, the protective means is moved to its operative position in advance of formation of the arc.

Still another feature of this invention is to provide mechanism of the foregoing type characterized in that the auxiliary circuit remains open or inoperative during the interval the welding circuit is closed. As a result, the auxiliary circuit is energized for only a fraction of a second and this is advantageous not only from the standpoint of safety, but also because it increases the life of the equipment.

Figures 1, 2:
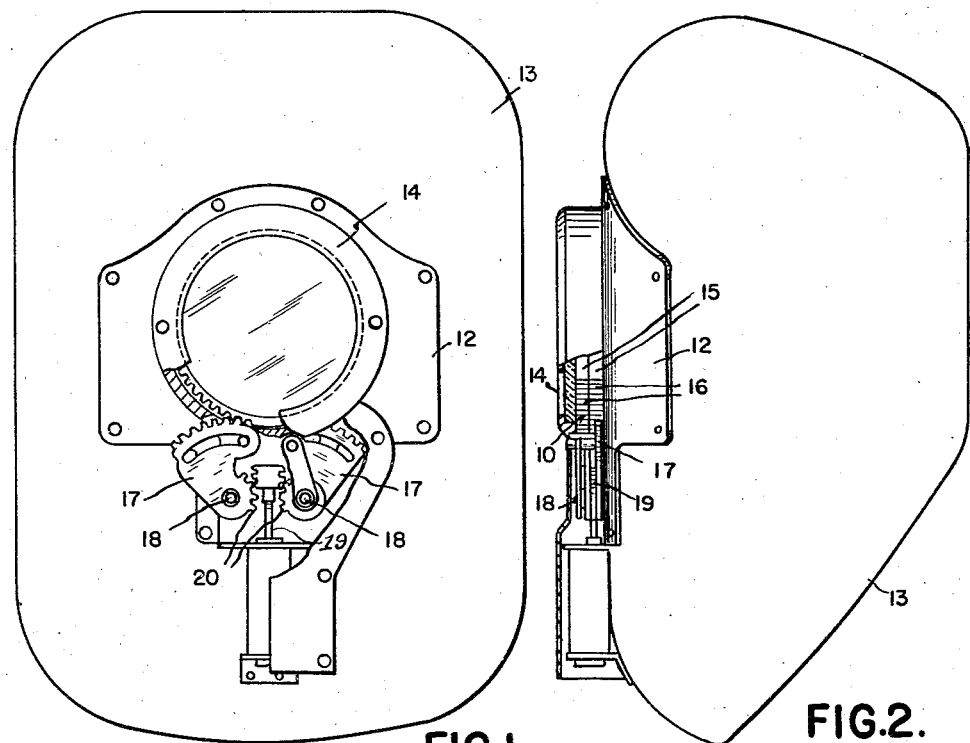
Figure 3:
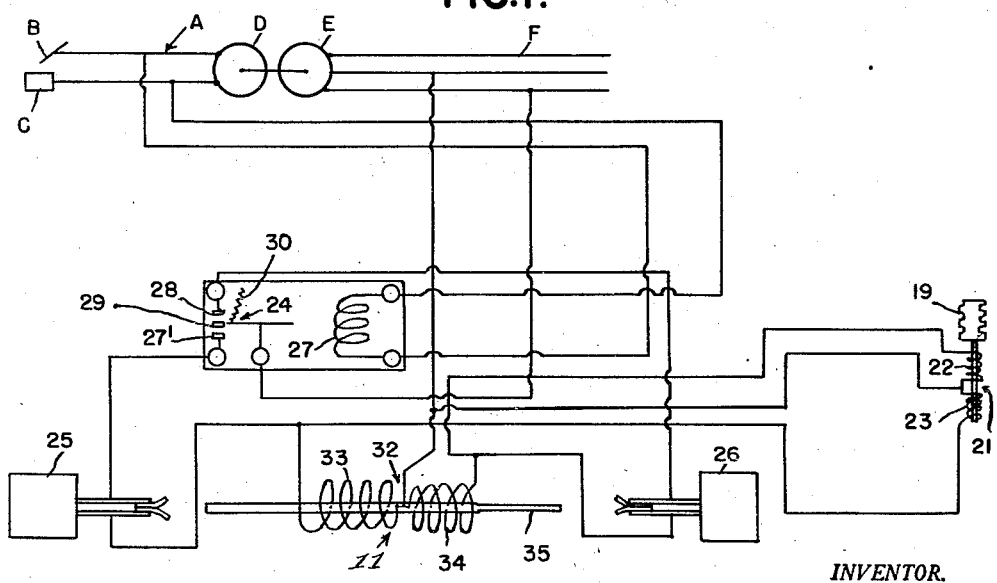

The foregoing as well as other objects will be made more apparent as this description proceeds, especially when considered in connection with the accompanying drawing, wherein Figure 1 is a front elevational view of a shield embodying this invention and showing certain parts broken away for the sake of clearness;

Figure 2 is a side elevational view, partly in section, of the construction shown in Figure 1; and Figure 3 is a diagram of the circuit arrangement employed.

In the type of welding commonly referred to as arc welding, an arc is produced between the welding electrode and work to be welded. This arc produces an intense glare and protection is usually afforded the eyes of the operator by a shield or hood fashioned to fit on or over the head of the operator. The shield ordinarily embodies a dark window arranged to assume a position opposite the eyes of the operator when the shield is properly positioned on his head.

Owing to the fact that the arc formed in the normal course of arc welding is of a very intense nature, it is necessary to provide a window which is practically opaque to light rays emitting from normal sources in order to afford the required protection. Actually the condition is such that the operator is able to properly see the work only when the arc is burning and is usually required to tip or remove the shield entirely in order to view the work between welding operations. When considering that certain welding operations require frequent examination of the weld before the desired weld is obtained, it will be understood that considerable time is wasted in manipulating the shield, to say nothing of the inconvenience to the operator.

It has been proposed to overcome the above objections by operating a protective lens on the shield automatically in timed relation to the operation of the welding circuit. However, difficulty has been experienced in providing equipment which is not only safe, compact and simple, but which also possesses the characteristics required to move the protective lens to its operative position before the arc is actually formed.

In general, the present invention overcomes the above difficulties by employing protective means in the form of oppositely rotatable polarizing elements or lenses 10 in combination with an electrical control or auxiliary circuit 11 for operating the polarizing elements. The arrangement is such that when the two polarizing elements 10 are in such angular position that their polarizing axes are parallel, maximum light is transmitted therethrough. The amount of light transmitted through the lenses is progressively decreased to a minimum value by relatively rotating the lenses from the position previously stated to a position wherein the axes thereof are at right angles to each other. It follows from the above that the lenses may be selectively positioned in any one of a number of relative positions to obtain the proper amount of light transmission for the particular circumstances encountered. The characteristic of polarizing lenses which effectively blocks substantially all light rays except those vibrating in the polarizing planes of the respective lenses is important because instantaneous reduction of light transmission follows initial relative movement of the lenses from a position wherein little or no obstruction is offered to the passage of light rays. This feature distinguishes the present arrangement from the usual colored filters which must be moved across the entire opening in the shield before the required reduction in light transmission results. In other words, a relatively longer period of time is required to effect the desired reduction of light transmission with the ordinary colored filter and when considering the rapidity with which the arc is produced, it will be seen that the light rays must be blocked instantaneously in order to afford the required protection.

With the above in view, reference will now be made more in detail to the drawing, wherein it will be noted that the polarizing lenses 10 are supported for relative rotation in a housing 12 suitably secured to a shield in the form of a hood 13. The hood 13 is preferably formed of a light weight material which resists transmission of light rays and is adapted to be strapped or otherwise supported on the head of the operator. The polarizing lenses are held in juxtaposition in the housing 12 by means of a retainer 14 detachably secured to the housing by means of screws or equivalent fastener elements. The lenses 10 are respectively mounted in rings 15 having teeth 16 on the periphery thereof. The rings 15 together with the lenses 10 are rotated about a common axis by a pair of toothed segments 17 supported in the housing 12 in lateral spaced relation for rocking movement about the axes of parallel pins 18 with the teeth thereof respectively meshing with the teeth 16 on the rings 15.

The segments are rotated in opposite directions by means of a reciprocable rack 19 supported for travel in a vertical direction between the pins 18 and having teeth on opposite sides adapted to respectively mesh with a second set of teeth 20 on the segments 17. The gear segments 17 are respectively secured to the pins 18 so that movement of the rack 19 in one direction rotates the pins 18 together with the lenses 10 in opposite directions toward a position wherein the polarizing axes of the two lenses 10 are at right angles to each other and movement of the rack in the other direction relatively rotates the lenses in directions opposite to the directions of rotation thereof aforesaid to position the polarizing axes of the two lenses in parallel relation wherein minimum resistance is presented to the passage of light rays through the lenses.

By driving both lenses in the manner stated, the angular travel of the lenses required to block the light rays is reduced to a minimum and the time interval for accomplishing this result is correspondingly reduced. This feature is largely responsible for the ability of the device to adjust itself to the protecting position before the arc is actually formed.

Referring now to Figure 3 of the drawings, it will be noted that the rack 19 is moved in opposite directions by a double acting solenoid 21 having individually wound coils 22 and 23 electrically connected in the control circuit 11. The coils 22 and 23 are alternately energized from the welding circuit A through a relay 24 and a pair of auxiliary switches 25 and 26. The relay operating coil 27 is electrically connected across the welding circuit A and the auxiliary switches 25 and 26 are electrically connected in the control circuit 11 between the relay 24 and solenoid 21. As shown in Figure 3, the auxiliary switch 25 and coil 23 of the solenoid 21 are electrically connected in series with the contact 27' of the relay 24, and the auxiliary switch 26 together with the coil 22 of the solenoid 21 are electrically connected in series with the opposing contact 28 of the relay 24.

It follows from the above that when the welding circuit A is open or, in other words, when the welding rod B is spaced sufficiently from the work C to extinguish the arc, the relay coil 27 is energized due to the rise in voltage in the relay circuit. Energization of the relay coil 27 operates the intermediate or movable relay contact 29 against the action of the spring 30 and engages the latter contact with the contact 27'. As a result, a circuit is established through the auxiliary switch 25 and solenoid coil 23 to the supply circuit F. Energization of the solenoid coil 23 operates the rack 19 to in turn rotate the polarized lenses in opposite directions to their inoperative positions wherein maximum light is passed through the lenses.

On the other hand, when the welding circuit is closed or, in other words, when the welding rod is advanced toward the work sufficiently to establish an arc between the work and rod, the voltage drops in the welding circuit and deenergizes the relay coil 27. This enables the spring 30 to engage the contact 29 of the relay with the contact 28 and establish the circuit through the auxiliary switch 26 and solenoid coil 22. Energization of the coil 22 operates the rack 19 to relatively move the polarized lenses to positions wherein the minimum light is permitted to pass through the lenses.

As soon as the polarized lenses are relatively rotated to either of the two above mentioned positions, the flow of current to the solenoid is discontinued. This is accomplished by alternately operating the auxiliary switches 25 and 26 with a second solenoid 32 electrically connected in parallel relation to the solenoid 21 and also having individually wound coils 33 and 34. These coils are shown in Figure 3 as electrically connected in the control circuit in a manner to become alternately energized as the relay contacts 27' and 28 are respectively closed by the relay 24. In detail, when the welding circuit A is open or when the relay coil 27 is energized to engage the contact 29 with the contact 27', current passes through the coil 33 of the solenoid 32 as well as through the coil 23 of the solenoid 21. On the other hand, when the relay coil 27 is deenergized by the drop in voltage in the control circuit occasioned by closing the welding circuit A, current passes through the coil 34 of the solenoid 32 as well as through the coil 22 of the solenoid 21.

It will also be noted from Figure 3 that the solenoid 32 operates a reciprocable plunger 35. This plunger is responsive to energization of the coil 33 of the solenoid 32 to shift to the left, as viewed in Figure 3, and open the auxiliary switch 25 to, in turn, discontinue the flow of current to the solenoid 21 on the mask. Of course, it follows that energization of the opposing solenoid coil 34 reverses the movement of the plunger 35 and opens the auxiliary switch 26 which, in turn, also discontinues the flow of current to the solenoid 21.

The operation of the solenoid 32 and associated plunger 35 to open the auxiliary switches is, of course, timed to insure proper operation of the polarized lenses before the circuits to the lens control solenoid 21 are actually broken. This time lag need not be great, however because the nature of the driving connection between the solenoid operated rack 19 and lenses 10 is such as to insure positive, practically instantaneous operation of the lenses.

The arc welder chosen for the purpose of illustration comprises the electrode or welding rod B mounted in a suitable portable holder (not shown) and supplied with direct current by a generator D. The generator D is coupled to a suitable motor E, shown in Figure 3 as being of the three-phase type and connected in a supply circuit F.

In accordance with conventional practice, the workman manipulates the electrode holder in such a manner that the free end of the electrode B is spaced above the work C to provide the desired arc therebetween. When this condition exists the welding circuit A is closed and the relay coil is deenergized due to the resulting voltage drop in the control circuit. The spring 30 is then free to operate the relay to close the circuit to the coils 22 and 34 of the solenoids 21 and 32, respectively. This action results in relatively rotating the lenses 10 to their light blocking positions, as clearly set forth above. It may be pointed out at this time that the coil 22 of the lens operating solenoid 21 is energized a fraction of a second before the arc is actually developed and, as a result, the polarizing lenses are rotated to their light blocking positions before the light from the arc reaches the shield. This may be due to the fact that the coil 22 is energized by a voltage drop in the welding circuit which takes place a fraction of a second before the arc is established.

Attention is also called to the fact at this time that the resistance offered by the coil 34 is somewhat greater than the resistance of the coil 22 and the armature travel of the solenoid 32 is greater than the armature travel of the solenoid 21. As a result, a sufficient lag is provided between energization of the coil 22 and opening of the auxiliary switch 26 to insure operation of the lenses to their light blocking positions before the switch 26 is actually opened to deenergize the solenoid 21.

Upon completion of the welding operation, the welding circuit is opened by withdrawing the welding rod a sufficient distance from the work to extinguish the arc. This action produces a voltage rise in the relay circuit sufficient to energize the relay coil 27 and close the circuits to the solenoid coils 23 and 33. As a result, the polarized lenses are immediately relatively rotated by the rack 19 to their light passing positions and the switch 25 is subsequently opened to break the circuits to the solenoid 21. The time lag required to insure operation of the lenses before opening the switch 25 is insured in the same manner previously set forth in connection with the switch 26.

What I claim as my invention is:

1. A welding shield for use in connection with a welding circuit adapted to be opened and closed, said shield having light protective means movable from a position wherein light rays pass freely through the shield to a position wherein the passage of light rays through the shield is substantially reduced, a control circuit for the protective means operable upon closing the welding circuit to move the protective means to said second named position and operable upon opening the welding circuit to move the protective means to the first mentioned position, and means for opening the control circuit subsequent to movement of the protective means to either of said two positions aforesaid.

2. A protective shield for use in connection with a welding circuit adapted to be opened and closed, said shield having juxtapositioned lenses supported on the shield for relative rotation in opposite directions and operable in one relative position thereof to permit substantially free passage of light rays therethrough and in another relative position thereof to practically block the passage of light rays through the shield, a control circuit including a double acting solenoid operatively connected to the lenses to move the latter between the two positions aforesaid, and means for energizing the control circuit in response to opening and closing of the welding circuit.

3. A welding shield for use in connection with a welding circuit adapted to be opened and closed, said shield having light protective means movable from a position wherein light rays pass freely through the shield to a position wherein the passage of light rays through the shield is substantially reduced, a control circuit energized by the welding circuit and comprising a double acting solenoid having a pair of coils alternatively energized upon closing and opening the welding circuit to successively move the protective means to the second and first named positions aforesaid, and means for opening the control circuit immediately after movement of the protective means to either of the two aforesaid positions thereof.

4. A protective shield for use in connection with a welding circuit adapted to be opened and closed, said shield having a pair of juxtapositioned polarizing elements mounted thereon for rotation in opposite directions, a control circuit energized by the welding circuit and comprising a double acting solenoid having a pair of coils alternatively energized upon closing and opening the welding circuit to successively rotate the polarizing elements in opposite directions, and means including a second double acting solenoid having coils alternatively energized in timed relation to the energization of the coils of the first named solenoid to open the control circuit subsequent to movement of the polarizing elements in either of said directions.

5. A protective shield for use in connection with a welding circuit adapted to be opened and closed, said shield having a pair of juxtapositioned polarizing elements mounted thereon for relative rotation from a position wherein the polarizing axes of said elements are parallel to a position wherein the polarizing axes of the elements are at substantially right angles to each other, a control circuit energized by the welding circuit and including electrically operated means for relatively rotating the elements to the second named position, and means for opening the control circuit in timed relation to relative movement of the polarizing elements to the said second mentioned position.

6. A protective shield for use in connection with a welding circuit adapted to be opened and closed, said shield having a pair of juxtapositioned polarizing elements mounted thereon for relative rotation from a position wherein the polarizing axes of said elements are parallel to a position wherein the polarizing axes of the elements are at substantially right angles to each other, a control circuit energized by the welding circuit and including electrically operated means for relatively rotating the polarizing elements in opposite directions between the two positions aforesaid, and means operable in timed relation to movement of the polarizing elements to either of said two positions to open the control circuit.

SAMUEL OSCHIN.

REFERENCES CITED

The following references are of record in the file of this patent:

UNITED STATES PATENTS

| Number | Name | Date |
|---|---|---|
| 1,822,308 | Norton | Sept. 8, 1931 |
| 2,036,224 | Lincoln et al. | Apr. 7, 1937 |
| 942,393 | Konig | Dec. 7, 1909 |
| 2,064,812 | Bouchard | Dec. 22, 1936 |
| 2,058,169 | Montague | Oct. 20, 1936 |
| 2,186,498 | Riggs | Jan. 9, 1940 |
| 2,337,651 | Douglass | Dec. 28, 1943 |